(12) United States Patent
Kaufmann et al.

(10) Patent No.: US 10,969,794 B2
(45) Date of Patent: Apr. 6, 2021

(54) SYSTEM WITH GLOBAL POSITIONING AND RF TIME-OF-LIGHT RANGING FOR SUPERVISING THE SAFETY ON A SITE

(71) Applicant: SAFEMINE AG, Baar (CH)

(72) Inventors: Thomas Kaufmann, Zürich (CH); Tommi Juhani Kauppinen, Manly West (AU)

(73) Assignee: SAFEMINE AG, Baar (CH)

( * ) Notice: Subject to any disclaimer, the term of this patent is extended or adjusted under 35 U.S.C. 154(b) by 235 days.

(21) Appl. No.: 16/172,110

(22) Filed: Oct. 26, 2018

(65) Prior Publication Data
US 2019/0129446 A1    May 2, 2019

(30) Foreign Application Priority Data

Oct. 26, 2017 (EP) ...................................... 17198716
Oct. 25, 2018 (EP) ...................................... 18202710

(51) Int. Cl.
*G05D 1/02*  (2020.01)
*G01S 13/76*  (2006.01)
(Continued)

(52) U.S. Cl.
CPC .......... *G05D 1/0289* (2013.01); *G01S 5/0289* (2013.01); *G01S 13/765* (2013.01);
(Continued)

(58) Field of Classification Search
CPC ... G05D 1/0289; G01S 5/0289; G01S 13/765; G01S 13/767; G01S 13/878; G01S 19/46; G01S 17/06; A42B 3/046; B66C 15/065
See application file for complete search history.

(56) References Cited

U.S. PATENT DOCUMENTS

| 2013/0015963 A1* | 1/2013 | Stegmaier | A42B 3/046 340/435 |
| 2015/0161872 A1* | 6/2015 | Beaulieu | G01S 13/06 340/686.6 |

FOREIGN PATENT DOCUMENTS

| WO | 2011/069266 A1 | 6/2011 |
| WO | 2011/130861 A1 | 10/2011 |
| WO | 2014/043824 A1 | 3/2014 |

OTHER PUBLICATIONS

Normon Abramson, "The ALOHA System—Another Alternative for Computer Communications", Proc. 1970 Fall Joint Computer Conference. AFIPS Press. 1970.
(Continued)

*Primary Examiner* — Anne Marie Antonucci
*Assistant Examiner* — Andrew J Cromer
(74) *Attorney, Agent, or Firm* — Maschoff Brennan (57) ABSTRACT

A system for determining an object position on a site with large machinery, particularly a mine site, a construction site, or an agricultural area, based on radio frequency time-of-flight ranging. The system is configured to determine a current position of a reference point indicative of a position of a machine on the site, to access an arrangement dataset indicative of a positional relationship between the reference point and a mounting location on the machine of at least one anchor of a point-to-point radio ranging unit, and to determine a position of the at least one anchor based on the current position of the reference point and the arrangement dataset, wherein the position of the at least one anchor is provided to a position determining unit configured for determining position information of tags based on ranging data of the point-to-point radio ranging unit.

15 Claims, 4 Drawing Sheets

(51) Int. Cl.
    *G01S 13/87*     (2006.01)
    *G01S 5/02*     (2010.01)
    *G01S 19/46*     (2010.01)
    *G01S 19/17*     (2010.01)

(52) U.S. Cl.
    CPC .......... *G01S 13/767* (2013.01); *G01S 13/878* (2013.01); *G01S 19/46* (2013.01); *G01S 19/17* (2013.01)

(56) References Cited

OTHER PUBLICATIONS

EP Search Report in application No. 17 19 8716 dated Apr. 10, 2018.

* cited by examiner

Fig.4

SYSTEM WITH GLOBAL POSITIONING AND RF TIME-OF-LIGHT RANGING FOR SUPERVISING THE SAFETY ON A SITE

CROSS-REFERENCE TO RELATED APPLICATIONS

This application claims priority to European Patent Application No. 17198716.7 filed on Oct. 26, 2017 and 18202710.2 filed Oct. 25, 2018. The foregoing patent applications are incorporated herein by reference.

FIELD OF INVENTION

The invention relates to a system for determining an object position on a site with large machinery. More particularly, the present invention relates to a system for determining an object position on a mine site, a construction site, or an agricultural area, based on radio frequency time-of-flight ranging, particularly in combination with global positioning.

BACKGROUND

By way of example, mine sites, e.g. a surface mine, and construction sites are generally operated by means of a large number of machinery, vehicles, and staff. Some of the machines or vehicles may be exceedingly large and heavy, wherein control of such oversized objects is difficult and dangerous, e.g. because of limited operator visibility. Thus, a person or a regular vehicle, e.g. a street legal vehicle, working in the vicinity is at risk from a movement of this oversized object.

It has been proposed to use GNSS-devices (GNSS=global navigation satellite system, such as GPS, DGPS or RTK GPS) on board of vehicles and other objects, such as cranes, to generate proximity warnings in order to reduce the risk of collisions between vehicles and/or persons. Such a system may be based on devices mounted to the objects, each device comprising a GNSS receiver, a control unit for deriving positional data using the signal of the GNSS receiver, a radio circuit for wireless exchange of the positional data with the other devices, and an output device for outputting proximity warnings, e.g. allowing the driver of a vehicle to obtain information on some of the obstacles or persons nearby. However, a GNSS system may lose accuracy, e.g. when multi-path situations occur. For example, a multi-path situation occurs when signals transmitted from GNSS satellites are reflected by local terrain, buildings, or machinery, thereby resulting in a plurality of signals being received by the GNSS receiver. Due to the plurality of signals being received, each of which may be phase shifted and/or time delayed, the GNSS receiver may not be able to accurately detect its location. Thus, if the GNSS system loses accuracy, such as due to entering a multi-path environment, the overall warning system may be severely hindered in its accuracy.

Similarly, generic tracking radars used on such sites are typically limited in range due to multiple reflections on site, wherein it may often be necessary to warn pedestrians and drivers beyond the radar range.

The deficiencies of a GNSS or radar based warning system may be overcome by using a radio based positioning system, i.e. a pseudolite type of positioning system using radio signals.

An assembly of radio frequency (RF) devices, often called "anchors" and "tags", may be distributed over several locations, which devices communicate with each other. Some of the devices may be installed on movable objects while others may be installed at fixed locations. In particular, a device may be mounted to any object that needs to be protected, e.g. a survey instrument or a person, i.e. affixed to the person in such a manner that the person will carry it without requiring the use of his/her hands. For example, the device may be affixed to a piece of clothing or equipment, such as a helmet, that the person is wearing.

For example, a radio frequency device, i.e. an anchor or tag, may comprise a radio transceiver for RF time-of-flight measurements (e.g. by two-way ranging or by time-difference-of-arrival), based on a defined measurement protocol for radio communication, e.g. the ALOHA protocol. In particular, ultra-wideband signals may be used to mitigate for multi-path effects.

However, point-to-point radio frequency ranging between, e.g., one anchor and a tag solely provides the distance but no direction to the tag. At least three anchors are required to unambiguously provide the tag position relative to the three-anchor arrangement.

Alternatively, the point-to-point radio ranging system may comprise a set of anchors which are adapted and specifically foreseen as fixed stations to be used within a multilateration measurement protocol.

For providing an accurate and reliable positioning system, e.g. for proximity warning, a multitude of anchors is required. However, many anchor-tag configurations nevertheless remain, wherein accurate triangulation may be hindered, e.g. because of the large and bulky structure of the oversized objects, and thus wherein the overall warning system may be severely hindered in its accuracy.

Furthermore, at least one reference anchor with known position is required in order that the radio ranging positioning system can provide absolute positioning information with respect to a local coordinate system of the site or with respect to a global coordinate system. Therefore, a set of anchors with fixed and known position are typically distributed over the site as reference stations. However, as the site is constantly evolving frequent repositioning of reference stations is required, particularly in order to prevent blind spots where neither a tag nor anchor required for determining the position of the tag can see a reference station.

BRIEF DESCRIPTION

It is therefore an object of the present invention to provide an improved and more reliable system for determining an object position on a site with large machinery, particularly for supervising the safety on the site, which overcomes the above mentioned limitations.

This object is achieved by realizing the features of the independent claim. Features which further develop the invention in an alternative or advantageous manner are described in the dependent patent claims.

Some aspects of the invention relate to a system for determining an object position on a site with large machinery, e.g. a mine site, a construction site, or an agricultural area. The system comprises a point-to-point radio ranging unit having: a plurality of radio transceivers as anchors, wherein the anchors are adapted and specifically foreseen to be mounted on large machinery, particularly a haul truck, a crane, a dragline, an excavator, a shovel, or a tractor; and a plurality of radio transceivers as tags, wherein the tags are adapted and specifically foreseen to be carried by a movable object, e.g. by a person, a street legal vehicle, or one of the machines. The point-to-point radio ranging unit is configured for providing ranging data indicative of distances between anchors and tags, based on a defined measuring protocol, particularly based on the ALOHA protocol, of a time-of-flight measurement by radio frequency signals, particularly ultra-wideband signals. Furthermore, the system comprises a position determining unit configured for determining position information of tags based on ranging data of the point-to-point radio ranging unit.

Typically, tags and anchors are essentially identical radio transceivers, wherein the radio transceiver of which a position is determined is referred to as the "tag" and the radio transceivers used for position determination of the tag are referred to as "anchors". Alternatively, it is also conceivable to have dedicated radio transceivers which are configured to only act as tag or as anchor.

According to some aspects of the invention, the system is configured to determine a current position of a reference point indicative of a position of a machine of the large machinery, to access an arrangement dataset indicative of a positional relationship between the reference point and a mounting location of at least one of the anchors on the machine, to determine a position of the at least one anchor based on the current position of the reference point and the arrangement dataset, and to provide the position of the at least one anchor to the position determining unit.

The reference point may be co-moving with the machine, e.g. wherein the machine is equipped with a GNSS/GPS receiver which provides a current position of the machine. By way of another example, the reference point may be given by a reflective target mounted on the machine for determining the machine position by means of a total station, particularly a total station with tracking functionality.

Alternatively, the reference point may also be a defined position on the site, e.g. stored in a site plan comprising a deployment schedule of the machine, wherein the machine is accurately positioned with respect to this "static" reference point, e.g. directly above the reference point.

According to one embodiment, the system is configured to determine the current position of the reference point based on at least one of a local positioning unit configured for providing positioning data in a local coordinate system of the site, a global positioning unit configured for providing positioning data in a global coordinate system, and a site plan comprising positional information for the reference point, particularly a deployment schedule of the machine with associated information on a positional relationship between the machine and the reference point.

By way of example, at least one of the local and global positioning unit is based on at least one of a global navigation satellite system (GNSS), a differential global navigation satellite system (DGNSS), a real time kinematic (RTK) global positioning system, a total station, particularly a robotic total station, and a radio frequency positioning system.

In a further embodiment, the arrangement dataset comprises at least one of: geometrical information on the dimensions and shape of the machine, e.g. a CAD (CAD: computer aided design) model of the machine; arrangement and/or motion information of the machine, particularly configured to determine relative positional changes between the mounting location of the at least one of the anchors and the reference point, e.g. wherein the reference point is located in the base of a crane and the anchor is mounted on the boom of the crane moving with respect to the base, wherein movement of the boom is determined by control parameters of the crane and/or by monitoring sensors configured to detect an arrangement parameter and/or an arrangement change of the machine, e.g. IMU sensors (IMU: inertial measuring unit), linear distance sensors, and/or joint angle sensors; a location of the reference point on the machine, e.g. a location of a transceiver of the global and/or local positioning unit; the mounting location of the at least one of the anchors on the machine, e.g. indicated in a CAD model of the machine; a heading of the machine, e.g. determined by an IMU system, a GNSS, and/or a total station; and a two-dimensional or three-dimensional vector indicating a distance between the location of the at least one anchor and the reference point and a two-dimensional or three-dimensional orientation of the location of the at least one anchor with respect to the reference point.

In another embodiment, the position determining unit is configured for determining a position of at least one other of the anchors based on the position of the at least one anchor. Therefore, based on the determined position of the at least one anchor, an accurate map of anchor positions can be generated with respect to a site coordinate system.

In particular, the system is configured to capture the position of the at least one anchor essentially in real time, particularly wherein the system comprises a central database configured for constantly storing updated positions of the anchors of the plurality of anchors.

Therefore, although some of the anchors are moving they still provide a real time reference for absolute positioning with respect to a local coordinate system of the site or with respect to a global coordinate system. Therefore, the number of available reference stations is increased, the number of blind spots is decreased, and distribution of fixed reference stations is not required anymore or can be reduced to a minimum.

Accordingly, in a further embodiment, the position determining unit is configured for determining a position of at least one of the tags by means of a triangulation measurement between the at least one tag and a subset of the anchors, e.g. at least two anchors, the subset of the anchors comprising the at least one anchor and/or the at least one other of the anchors whose position is determined based on the position of the at least one anchor, particularly wherein anchor positions of the subset of the anchors are derived from a central database storing real time position of anchors.

By way of example, anchor positions of at least part of the subset of anchors, particularly the determined position of the at least one anchor, are transmitted as payload within the point-to-point radio ranging unit, and the at least one tag is configured to determine its position by means of carrying out a triangulation with the subset of the anchors.

Alternatively, or in addition, the position determining unit comprises a central computing unit configured to carry out the triangulation measurement between the at least one tag and the subset of the anchors.

According to a further embodiment, the system comprises a site monitoring unit configured for tracking movements of the plurality of anchors and the plurality of tags on the site by taking into account position information of tags provided by the position determining unit, the site monitoring unit comprises an event detector configured to detect at least one event associated with the site based on a classification of the movements of the plurality of anchors and the plurality of tags, and the system comprises a feedback unit configured to provide feedback information based on the at least one event.

For example, events may be two objects on a collision course, an object trespassing a restricted area on the site, and/or a machine, e.g. a haul truck, violating a speed limit. More generally, an event is a particular change of the position or orientation of an element of the site, wherein event detectors may be based on person and/or object detectors, anomaly detectors, or special classifiers trained for recognizing a sequence and/or pattern of changes associated with the monitoring site, particularly to recognize specific operation workflows on the site.

In particular, the event detector is configured for at least one of recognition of a threat level, particularly a risk of collision, recognition of an activity associated with the site, and detection of an anomaly.

For example, the threat level may be predicted based on at least one of a heading of an anchor of the plurality of anchors and/or a heading of a tag of the plurality of tags, a speed of an anchor of the plurality of anchors and/or a speed of a tag of the plurality of tags, and an anchor identification (anchor ID) of an anchor of the plurality of anchors and/or a tag identification (tag ID) of a tag of the plurality of tags.

According to another embodiment, the event detector is based on at least one of: topological and/or logical and/or functional relationships of different entities associated with the site; a timetable representing times of human and/or automatic activities associated with the site, in particular wherein the timetable comprises planned working and/or operating times and/or comprises information about the type of activity and/or is embedded in a digital model of the site; an n-dimensional feature-space wherein an event is represented by an n-dimensional feature-vector, in particular wherein a respective class is represented by a section of the n-dimensional feature-space; and a neural network, in particular wherein a detected event representative of a sequence and/or pattern of changes associated with the monitoring site is fed into different units of an input layer of the neural network.

In a further embodiment, the system comprises a tracking unit configured to track the movements of the plurality of anchors and the plurality of tags, wherein the tracking unit is configured for providing positioning data associated to anchors and tags, particularly based on at least one of a global navigation satellite system, a differential global navigation satellite system, a real time kinematic global positioning system, a total station, particularly a robotic total station, and a radio frequency positioning system. Furthermore, the system is configured to determine a position determination offset associated to the positioning data of the tracking unit, wherein the position determination offset is determined by taking into account position information by the position determining unit, and the feedback unit is configured to provide the feedback information based on the position determination offset.

Thus, by way of example, global positioning and radiofrequency time-of-flight ranging can be fused, e.g. to improve relative position accuracy of determined positions of tags and/or anchors and/or for beneficial use of advantages of communication within a point-to-point radio ranging system, e.g. for raising an alarm in case positioning accuracy of the tracking unit falls below a defined threshold.

For example, the system may be configured that different modes for determining the position determination offset, e.g. different rates for determining the position determination offset, are triggered based on the feedback information, particularly based on a defined set of threat levels.

In another embodiment, the system is configured to provide the feedback information as payload within the point-to-point radio ranging system to a set of receivers comprising at least one of a tag of the plurality of tags and an anchor of the plurality of anchors, in particular wherein the feedback information comprises at least one of a local alarm signal associated to the set of receivers, a global alarm signal associated to all of the plurality of tags and/or all of the plurality of anchors, safety information associated to the set of receivers, corrected positioning information, and deployment instructions associated to the set of receivers.

In another embodiment, the system comprises a site information unit configured to provide site information data to the event detector, and the event detector is configured to take into account the site information data to detect the at least one event. For example, the site information data comprise at least one of: weather data; soil data; road condition data; a blast schedule; a zone plan of the site, particularly comprising at least one of a safety zone, a restriction zone, and a danger zone; an accident history; and personnel competence and clearance data, particularly comprising information if a person has sufficient training to operate a particular machine or to enter an area.

A further embodiment relates to the system comprising a training functionality configured to process the movements of the plurality of anchors and the plurality of tags, and to provide update information for the event detector.

By way of example, the training functionality is based on machine learning, wherein the event detector is trained by a machine learning algorithm. Machine learning provides a very efficient "learning approach" for pattern recognition as compared to rule-based programming and can deal with tasks of large complexity, make use of user feedback, and thus is highly adaptive.

For example, the training functionality may be based on at least one of: linear classification, in particular based on Fisher's linear discriminant, logistic regression, naive Bayes classifiers, or the perceptron; a support vector machine, in particular a least squares support vector machine; a quadratic classifier; Kernel estimation, in particular k-nearest neighbour; boosting; a decision tree, in particular based on random forests; a hidden Markov model; deep learning, in particular based on a neural network, particularly a convolutional neural network (CNN) or a recurrent neural network (RNN); and learning vector quantization.

BRIEF DESCRIPTION OF THE DRAWINGS

The system according to the invention is described or explained in more detail below, purely by way of example, with reference to working examples shown schematically in the drawing. Specifically, FIG. 1a,b: schematically depicts sites in the sense of the invention, here a surface mine (a) and a construction site (b).

DETAILED DESCRIPTION

Figure 1A:
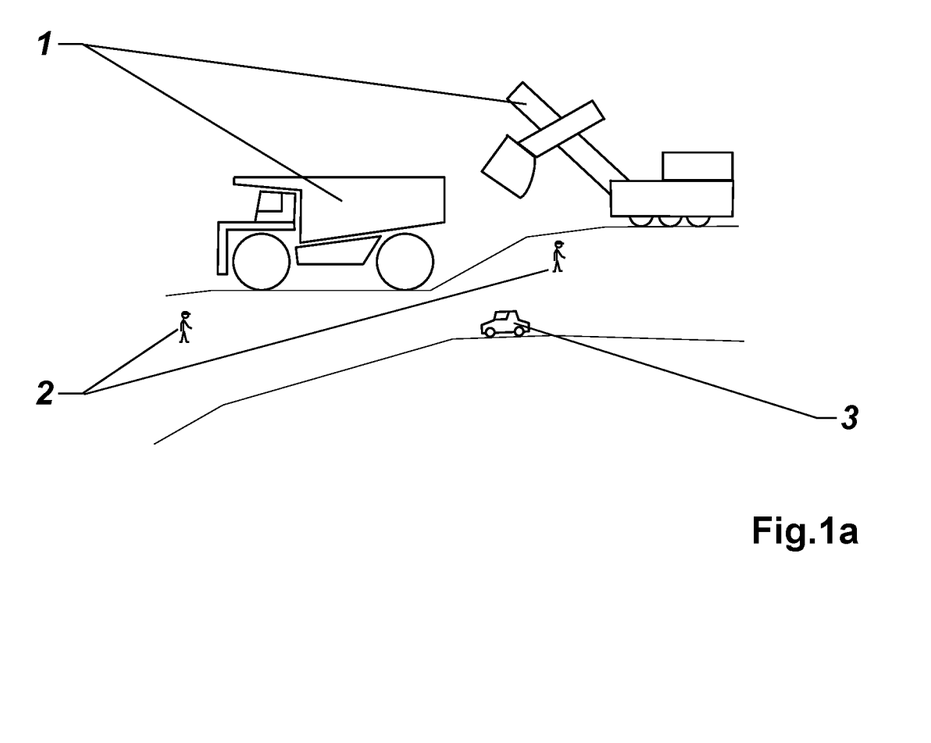
Figure 1B:
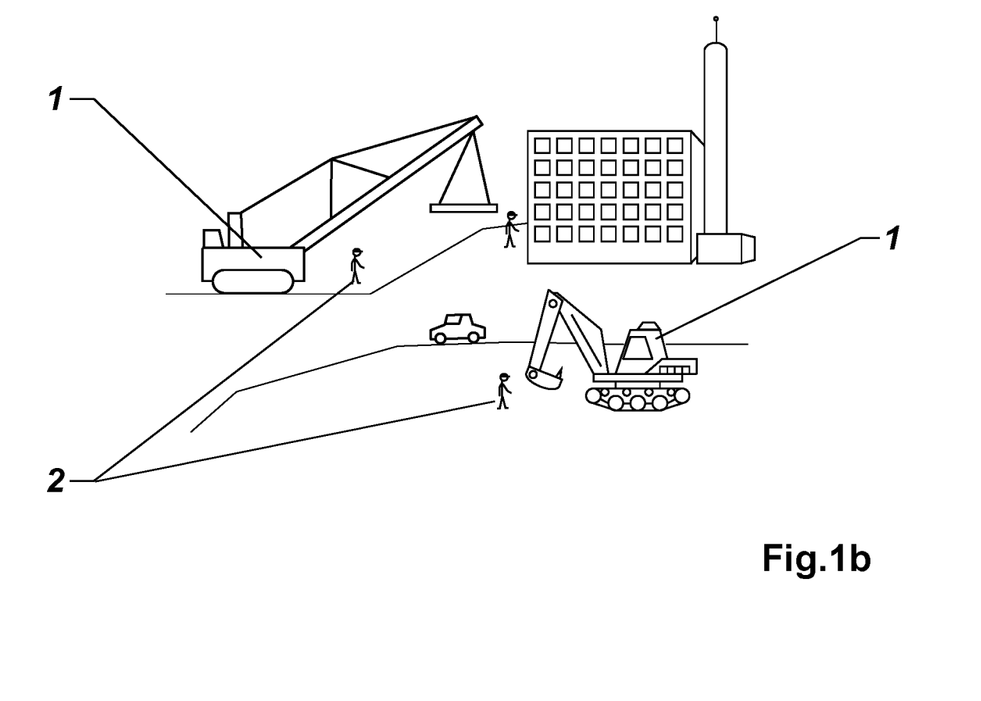

FIG. 1 schematically depicts two typical sites and environments with heavy duty equipment foreseen for application of the position determining system.

Typically, such sites cover a large area, in the case of a surface mine as depicted in FIG. 1a, e.g. in the range of square kilometres, with a network of roads and other traffic ways, such as rails. A plurality of oversized movable objects 1 may be present in the mine, e.g. haul trucks or heavy duty excavators, wherein pedestrians 2 or regular sized vehicles 3, e.g. street legal cars or trucks, are at severe risk from a movement of the oversized object 1.

Such oversized machinery or oversized vehicles may easily weigh several 100 tons, and they are generally difficult to control and have a large number of blind spots that the driver or operator is unable to constantly monitor. Any collision with a smaller object, in particular a pedestrian or a regular car, may be potentially fatal for the weaker object.

Furthermore, the mine is comprised of stationary obstacles, such as temporary or permanent buildings, open pits, boulders, non-movable excavators, stationary cranes, deposits, etc. Given the large operating force exerted by such oversized machinery, a collision with a stationary obstacle may cause severe damage to both the oversized object and the stationary obstacle, and may even compromise safety of an operator of the oversized object.

Typically a mine site is busy at day and night and is often run around-the-clock. Thus, operation includes a multitude of different work shifts and a high degree of coordination over a large area is required. In particular, the conditions on the site may vary fast on local and global scales, e.g. due to different weather conditions, work progress, accidents, change of schedules, change of restriction zones, development of new hazard zones, etc.

Therefore, the risk of accidents in such an environment is high, specifically under adverse conditions as bad weather, during night shifts, etc.

Similarly, on a construction site as depicted by FIG. 1b, heavy equipment 1 may be used, such as diggers, bulldozers, motor graders, or cranes.

For example, in road construction when a compactor is working in close proximity of a motor grader following it and the motor grader suddenly stops and starts to reverse can lead to a collision if neither of the operators is paying enough attention to their surroundings.

In general construction, for example a surveyor may be working in close proximity of an excavator without being noticed by the operator of the excavator. However, danger may also arise even if an operator of heavy machinery is paying attention. For example, an operator of a large cantilever crane may not immediately see small cantilever movements, e.g. caused by wind or inertia moments, which may be potentially dangerous for a spotter in the vicinity of the cantilever.

Figure 2:
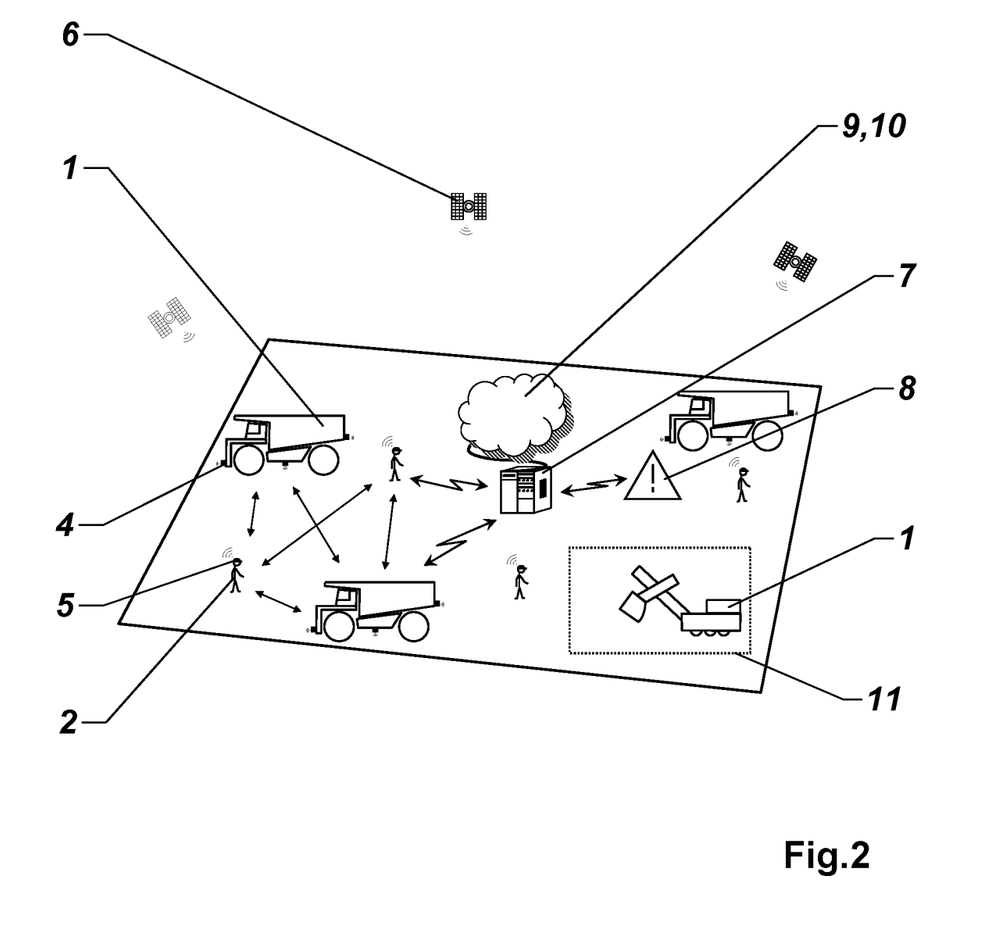
FIG. 2: schematically depicts the inventive system used as part of a safety supervision system in a surface mining environment.

FIG. 2 schematically depicts the inventive system used as part of a safety supervision system in a surface mining environment.

A plurality of anchors 4 are distributed on the site, wherein the anchors 4 are adapted and specifically foreseen to be mounted on oversized objects 1, e.g. on haul trucks or large excavators. Some anchors may also be adapted and foreseen as fixed stations.

A plurality of tags 5 are distributed on the site, wherein the tags 5 are adapted and specifically foreseen to be mounted on moving objects, e.g. such as pedestrians 2, cars 3, or oversized machines 1.

The anchors 4 and tags 5 are part of a point-to-point radio ranging unit which provides local ranging data between anchors 4 and tags 5, based on a defined measuring protocol, e.g. based on the ALOHA protocol, of a time-of-flight measurement by radio frequency signals. For example, measurements may be based on ultra-wideband signals to mitigate for multi-path effects and both anchor 4 and tag 5 may store measurement results.

The system further comprises a site monitoring unit based on the point-to-point radio ranging unit and a global positioning system 6, particularly based on a global navigation satellite system or a differential global navigation satellite system, for providing global positioning data of anchors 4 and tags 5.

The site monitoring unit is configured for tracking movements of movable objects, i.e. wherein the movable objects also carry anchors and/or tags of the plurality of anchors and the plurality of tags, wherein the global positioning data and the local ranging data are provided to a processing unit 7, e.g. a central server and computation unit, as payload within the point-to-point radio ranging system.

By way of example, a tag 5 may comprise a transceiver for time-of-flight measurements, a control unit, e.g. a microprocessor, a power or battery management unit, e.g. using a Qi charging interface for wireless charging or pins integrated in case for wired charging, and a user interface, e.g. comprising a vibrator and/or buzzer for alerting a user and a button to acknowledge alarms or to trigger a panic signal.

Furthermore, the tag 5 may comprise additional sensors, e.g. an acceleration sensor to determine idle mode for power saving, for man-down detection, or for secondary applications such as showing battery status when shaken, etc.

Furthermore the tag 5 may comprise ways to communicate over physical serial datalink to connect to external devices e.g. additional wearable sensors such as gas detectors. Furthermore the communication pins may have dual purpose as digital input and output channels to control external devices.

The tag 5 components may be fully integrated in a compact base housing, e.g. including battery and charging electronics, as well as a vibration component, buzzer, and LEDs for alerting.

The base housing may be configured such that it can be quickly attached to different mounts for wearing on a helmet, e.g. with rubber strap around helmet or with elastic straps attaching at four points to tie down the tag on the helmet, a vest, e.g. wherein the mount is permanently attached to the vest, on wrist, e.g. using an armband, on the upper arm, e.g. similar to a mobile phone holder for running/jogging, or on a belt, e.g. using a belt-clip.

By way of example, an anchor 4 may comprise a transceiver for time-of-flight measurements, a control unit, e.g. a microprocessor, a power or battery management unit, e.g. a robust power management taking power from a vehicle battery including surge protection, and a CAN transceiver, e.g. a CAN bus to connect to a radar CAN bus on a haul truck 1. Furthermore other serial communication mediums, e.g. Ethernet, may be used with relevant physical components to establish communication from anchor to the system.

Furthermore, the anchor 4 may comprise additional sensors and generic components, e.g. an acceleration sensor or an IMU to determine idle mode for power saving and an LED that shows device status, wherein the anchor components may be fully integrated in a compact base housing configured such that it can be quickly attached to a range of different mounts.

In particular, both anchor 4 and tag 5 may have unique IDs, e.g. configured during manufacture.

By way of example, the tag 5 may periodically send a BLINK message, e.g. comprising payload including ID, protocol version, timing information for the time-of-flight determination in case of an anchor response (e.g. a predefined time delay, see below), battery status, panic button status, etc., wherein an anchor 4 responds with a ranging INIT message after a random time interval (e.g. within a limited time window), wherein payload may include ID and protocol version. The tag 5 responds with a ranging FINAL message immediately (with clearly defined delay), e.g. again comprising payload which may include ID, protocol version, etc. The anchor 4 then responds with a ranging REPORT message, e.g. immediately or with a clearly defined delay, wherein payload may for example include ID, protocol version, warning distances from this vehicle, vehicle status, etc. The time-of-flight is measured as the difference between the anchor INIT transmit timestamp, the anchor FINAL receive timestamp, minus the time delay.

Thus, the above described measurement protocol uses ALOHA by nature. Alternatively, anchors may act as local coordinators, and define the order of tags that are ranged with.

The measurement protocol may further comprise reporting to a base, e.g. wherein after transmission/reception of a FINAL message, the anchor sends a CAN message and the tag enters measurement in queue.

Furthermore, the protocol may further comprise housekeeping, e.g. periodically, the tag computes a threat level based on reported distances, the tag measures battery charge status, wherein if battery charge falls below a safe status, the user may be alerted, e.g. visually, acoustically, or by tactile means, for example by a vibration of the tag housing.

The signal may be further processed, e.g. by assessing non-line-of-sight conditions or applying hysteresis. Housekeeping may further comprise that periodically, the anchor sends a heartbeat CAN message, wherein payload may include device status, number of rangings in this period, etc.

In particular, the tags 5 and anchors 4 may be configured, e.g. by generic hardware and control components, such that, for example, drivers or passengers of an oversized vehicle wearing tags are not generating alarms as long as they are located within the cabin, e.g. alarming may be suppressed both on a vehicle display and on tags. For example, a special anchor may be placed inside the cabin or an anchor on top of the cabin may be configured as a cabin anchor. When tags detect that they are within a certain distance of the cabin anchor, they go into cabin mode, e.g. which may further trigger a reduced measurement rate, wherein the associated current cabin anchor ID may be part of the payload to reduce RF traffic such that no other cabin anchor needs to reply. Once a passenger is out of the cabin threshold, or, e.g. its tag does not get a reply from the associated cabin anchor twice in a row, the tag goes back to normal mode and all anchors range with it again. Such a distance threshold may for example be configurable for each cabin anchor, stored in a main unit and propagated through the CAN transceiver of the anchor.

Furthermore, tags 5 may be configured such that tag alerting can be silenced. For example, while personnel should get warnings if an oversized vehicle approaches it may not be necessary that repeated alarms are provided related to the same vehicle, e.g. when mechanics are moving/working around the vehicle. However, e.g. depending on a changed threat level, the tag configuration should alert personnel even if alerts have been silenced.

For example, anchors 4 may include a vehicle identification in the status messages sent to the tag 5. The tag groups ranging from different anchors on the same vehicle together, and only acts upon the closest anchor. When personnel acknowledge the alarm on a tag by pressing an interface button, all current vehicles, at their current ranges, may be silenced. If a vehicle (i.e. an anchor configuration but not a single anchor) moves to a closer range, the tag should generate an alarm again for the vehicle at its new range, while vehicles moving further away will not cause the alarm to be renewed. If a vehicle moves out of range, it may be forgotten by the tag 5, so that if it reappears, it will cause a new alert.

By way of another example, an oversized vehicle 1 may have configurable areas and/or speed thresholds, which trigger transmission of a suppression flag as part of the CAN heartbeat message to the anchors 4. Thus, tags 5 may still be shown on a vehicle display but tag alerts may be avoided if the vehicle moves above certain speeds. Alternatively the warning distances may be temporarily set to infinity, e.g. wherein the anchors 4 continue to perform ranging as usual, but add a flag into the RF report payload. When a tag receives such a report, it is not included in the threat computation. The state may continuously be updated by the anchor, based on the flag in the CAN message. The anchors keep reporting their results through CAN messages to the main unit, where the behavior can be configured, e.g. "no audible but only visual alerts".

Based on the local ranging data, the central processing unit 7 determines position determination offsets for the global positioning data, e.g. measurement errors or inaccuracies due to GPS multi-path situations. Thus, the global positioning and the measured distance through RF time-of-flight ranging are fused to improve the relative position accuracy.

For example, an extended Kalman filter may be used, which tracks the relative position and/or velocity and potential GPS position offsets through measurement errors.

Based on such improved position accuracy the processing unit 7 derives feedback information regarding the safety on the site, which is transmitted as payload within the point-to-point radio ranging system to a set of defined tags 5 and/or anchors 4.

Such feedback information may, for example, comprise a local alarm signal 8, e.g. associated to a defined set of pedestrians 2 and/or haul truck drivers. Alternatively, such a local alarm signal 8 may be associated with a defined local area and be sent repeatedly, as soon as the processing unit recognizes tags 5 and/or anchors 4 entering the local area.

Furthermore, for example, the processing unit 7 may issue a general alarm to all the tags 5 and/or anchors 4, e.g. wherein the processing unit 7 sends two bits in a CAN heartbeat message to the anchors/tags to set four possible states (0: "no Alarm", 1: "Alert Low", 2: "Alert Medium", 3:"Alert High"). Such a general alarm may override other lower or equal alerts, e.g. wherein it may be possible that a worker 2 wearing a tag 5 suppresses a medium/low alert but not a high alert.

By way of another example, the feedback information may comprise instructions to workers/operators working within specific local areas, e.g. information/instructions on safety precautions or deployment instructions for next work assignments, etc.

In particular, the inventive system may further comprise an event detector 9, here e.g. located on the central server and computation unit of the processing unit 7, configured to detect at least one event associated with the site, e.g. based on time-resolved heading and/or speed information associated to specific anchor 4 and/or tag 5 IDs.

By way of another example, the system may be configured to carry out event detection in a more distributed manner, e.g. wherein at least part of event detection is carried out on the machines and results are sent to the central server and/or to surrounding machines by utilizing machine to machine communication.

Therefore, the processing unit 7 may analyze various reoccurring events, tracks, and work processes, compare them with site regulations and/or safety precautions, and thus predict potential threat levels for workers and machinery on the site.

Furthermore, the system may further have access to various auxiliary information 10 related to the site, e.g. such as weather data, soil data, road condition data, a blast schedule, a zone plan of the site, e.g. comprising different safety zones, restriction zones, or an accident history, e.g. identifying general potential danger zones.

Thus, the processing unit 7 may automatically control and supervise movements on the site and interactively react on arising threats, e.g. by temporally creating/adapting restriction zones 11 for a subset of tag IDs and/or anchor IDs.

In addition, for example, the system may also provide a site manager with information on irresponsible behaviour of a worker, e.g. a machine or vehicle operator.

By way of example, the oversized objects 1 and/or regular vehicles 3 on the site may be adapted such that a determined threat level may cause an automatic intervention to the oversized object 1 or the vehicle 3, e.g. an immediate stop of the object.

The threat level may further trigger a different position determination mode of the RF point-to-point ranging system, e.g. wherein in a basic mode, position determination offsets are calculated with a basic rate, whereas in a raised threat mode, position determination offsets are calculated with an increased rate.

It goes without saying that the inventive supervising system may also make use of a range of generic alarming and collision avoidance systems (CAS systems), e.g. it may be further make use of information from GNSS-based and/or radar based CAS systems.

Figure 3A:
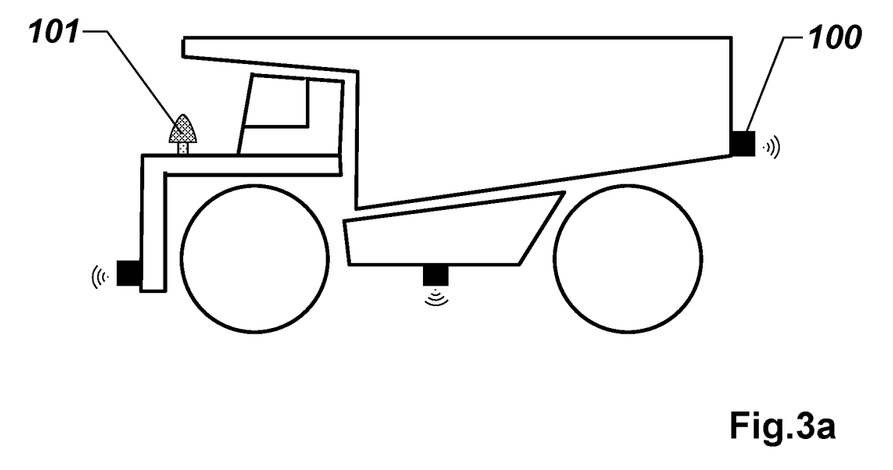
FIG. 3a,b: show an exemplary embodiment of the inventive position determining system on a surface mine site.
Figure 3B:
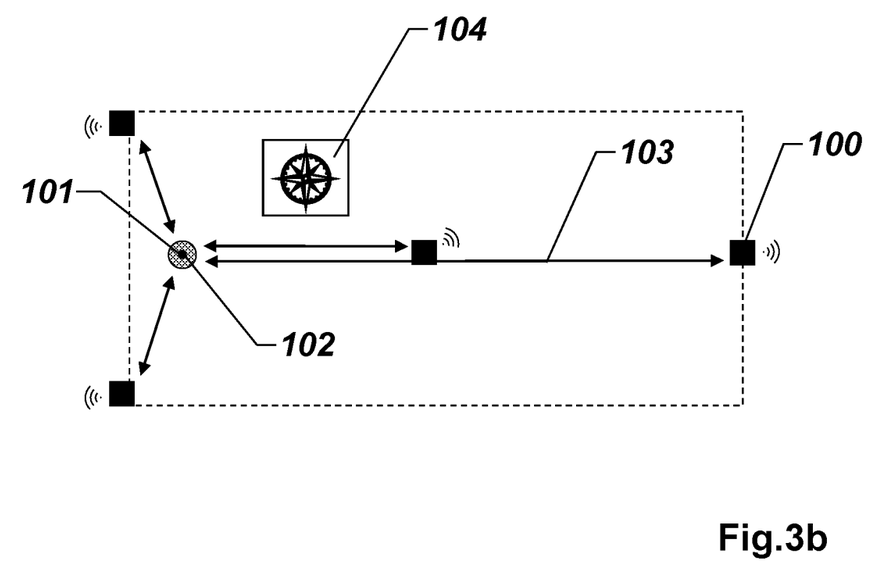

FIGS. 3a and 3b schematically show an exemplary embodiment of the inventive position determining system, here on a surface mine site, wherein FIG. 3a shows a side view of a haul truck and FIG. 3b shows the corresponding top view.

The system comprises of radio transceivers 100 acting as tags and/or anchors, wherein the radio transceivers 100 are mounted at different positions on the haul truck. In order to have full coverage around the haul truck, at least three radio transceivers 100 need to be placed on the vehicle. If fewer transceivers are chosen, only partial coverage is achieved.

The radio transceivers 100 are configured for radio frequency (RF) time-of-flight measurements (e.g. by two-way ranging), e.g. based on ultra-wideband signals to mitigate for multi-path effects and both anchor and tag may store measurement results. In particular, different radio transceivers 100 may have unique IDs, e.g. configured during manufacture.

In the example shown, an arrangement of four radio transceivers 100 is used, wherein one transceiver is mounted at the front left of the haul truck, one transceiver is mounted at the front right of the haul truck, and another one is mounted at the rear of the haul truck. Thus, as indicated by the schematic top view shown in FIG. 3b, these three anchors are arranged in such a way that the vertical projection points of these anchors are arranged along the sides of a rectangular basic shape. Furthermore, a fourth transceiver is mounted at the bottom of the haul truck, i.e. its vertical projection lies within the basic rectangular shape. Thus, also a person under the haul truck may be detected, which is particularly useful at start up, e.g. when the locks have been removed but some spotters or mechanics may still be working around or under the vehicle or when in hot conditions a worker rested in the shade of the haul truck.

The system further comprises a GNSS receiver 101, configured for determining the current position of the haul truck, wherein the location of the GNSS receiver 101 on the haul truck defines a reference point 102 indicative of a position of the haul truck in a global coordinate system.

The system further has access to an arrangement dataset, e.g. a CAD model of the haul truck, defining offsets 103 between the reference point 102 and mounting locations of the radio transceivers 100 on the haul truck. For example, the offsets 103 may be given in 3D or 2D, e.g. wherein only projections onto the horizontal plane are given.

In addition, the arrangement dataset comprises data from a relative navigation system 104 of the haul truck, e.g. based on a compass and an inertial measuring unit. Thus, an orientation and a relative movement of the haul truck can be determined.

The system is then configured to determine the current position of the reference point 102 based on global positioning by means of the GNSS receiver 101, and to determine a current position of at least one of the radio transceivers 100 by taking into account the current position of the reference point 102 as well as the transceiver location information and the haul truck orientation/relative movement information provided by the arrangement dataset.

Thus, although the haul truck, i.e. the radio transceivers 100, are moving the radio transceivers 100 can still be used as accurate reference anchors for providing real time absolute positioning. Therefore, fixedly installed reference stations can be replaced by transceivers mounted on different haul trucks and other moving objects which has the benefit that the number of available reference stations is increased and thus the number of RF positioning blind spots is decreased.

Figure 4:
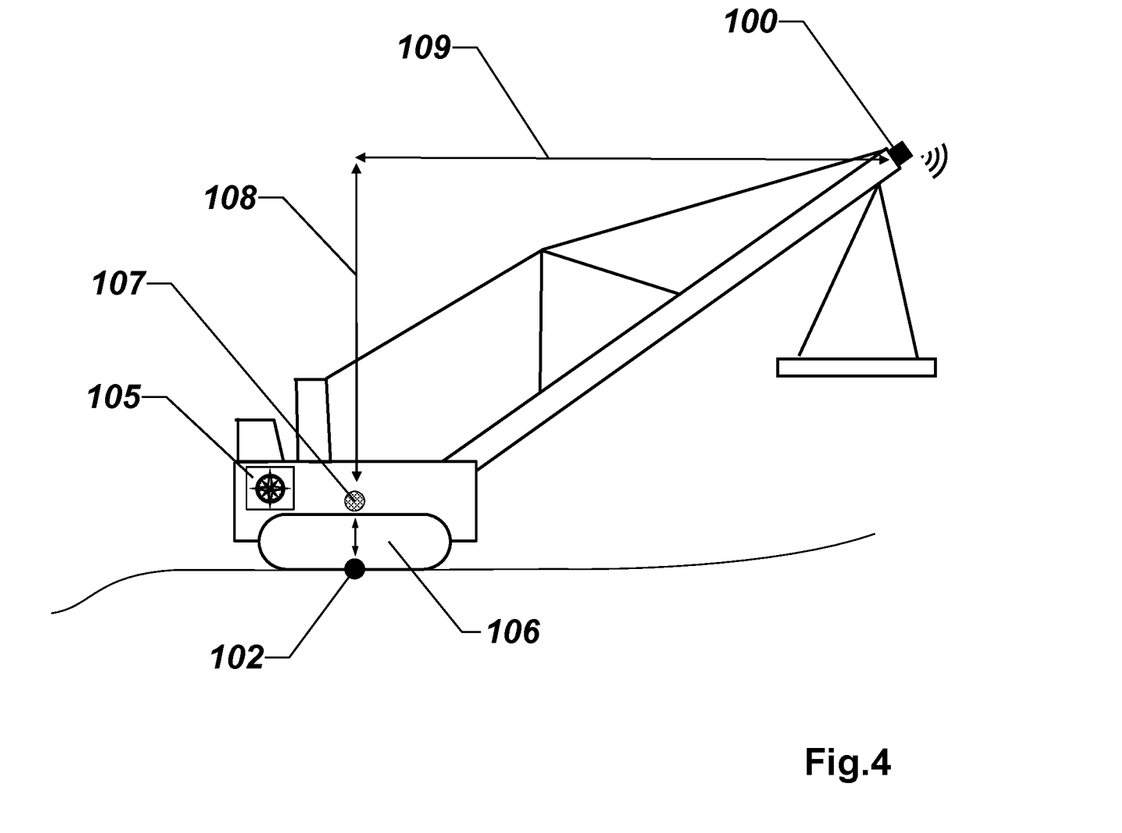
FIG. 4: shows another embodiment of the inventive position determining system on a construction site.

FIG. 4 schematically shows another exemplary embodiment of the inventive position determining system, here on a construction site, wherein the reference point 102 is a defined deployment position of a crane on the construction site.

The crane is positioned with respect to the static reference point 102, e.g. wherein a crane operator may provide the position determining system with an offset to the reference point 102 in case the crane cannot be exactly positioned as requested by the deployment schedule.

A radio transceiver 100 foreseen to be used as anchor of the point-to-point radio ranging unit is mounted on the crane, e.g. on the boom of the crane.

The arrangement dataset comprises again CAD data indicating the mounting location of the transceiver 100 on the crane. Furthermore, the arrangement dataset comprises motion data 105 of the crane, e.g. provided by control parameters of the crane and/or by IMU sensors. For example, the base of the crane may be kept fixed with respect to the reference point 102 so that an offset 106 between the reference point 102 and a rotation center 107 of the crane is constant. Furthermore, the motion data provide for a determination of the azimuthal boom angle and the boom motion, i.e. height 108 and horizontal distance 109 of the transceiver 100, with respect to the rotation center 107.

Thus, the current position of the radio transceiver 100 can be determined with respect to the reference point 102, i.e. with respect to the construction site coordinate system, by taking into account positional information in the deployment plan defining the reference point 102, the offset 106 between the reference point 102 and the rotation center 107 of the crane, and the motion data 105 of the crane.

Although the invention is illustrated above, partly with reference to some preferred embodiments, it must be understood that numerous modifications and combinations of different features of the embodiments can be made. All of these modifications lie within the scope of the appended claims.

What is claimed is:

1. A system for determining an object position on a site with large machinery, the system comprising:
   a point-to-point radio ranging unit having
      a plurality of radio transceivers as anchors, wherein the anchors are configured to be mounted on large machinery, and
      a plurality of radio transceivers as tags, wherein the tags are configured to be carried by a movable object,
      wherein the point-to-point radio ranging unit is configured for providing ranging data indicative of distances between anchors and tags, using a defined measuring protocol, which provides a time-of-flight measurement by radio frequency signals, and
   a position determining unit configured for determining position information of tags using time-of-flight ranging data of the point-to-point radio ranging unit,
   wherein the position determining unit is configured:
   to determine a current position of a reference point indicative of a position of a machine of the large machinery, the machine comprising at least one of the anchors,
   to access an arrangement dataset, which provides a predefined positional relationship between the reference point and a mounting location of the at least one of the anchors on the machine,
   to determine a position of the at least one anchor based on the current position of the reference point and the arrangement dataset, and
   to provide the position of the at least one anchor to the position determining unit.

2. A system according to claim 1, wherein the system is configured to determine the current position of the reference point based on at least one of:
   a local positioning unit configured for providing positioning data in a local coordinate system of the site,
   a global positioning unit configured for providing positioning data in a global coordinate system, and
   a site plan comprising positional information for the reference point.

3. The system according to claim 1, wherein the arrangement dataset comprises at least one of:
   geometrical information on the dimensions and shape of the machine,
   arrangement or motion information of the machine,
   a location of the reference point on the machine,
   the mounting location of the at least one of the anchors on the machine,
   a heading of the machine, and
   a two-dimensional or three-dimensional vector indicating a distance between the location of the at least one anchor and the reference point and a two-dimensional or three-dimensional orientation of the location of the at least one anchor with respect to the reference point.

4. The system according to claim 1, wherein the position determining unit is configured for determining a position of at least one other of the anchors based on the position of the at least one anchor.

5. The system according to claim 1, wherein the system is configured to capture the position of the at least one anchor essentially in real time.

6. The system according to claim 1, wherein the position determining unit is configured for determining a position of at least one of the tags by means of a triangulation measurement between the at least one tag and a subset of the anchors, the subset of the anchors comprising the at least one anchor or the at least one other of the anchors whose position is determined based on the position of the at least one anchor.

7. The system according to claim 6, wherein anchor positions of at least part of the subset of anchors are transmitted as payload within the point-to-point radio ranging unit, and the at least one tag is configured to determine its position by means of carrying out a triangulation with the subset of the anchors.

8. The system according to claim 6, wherein the position determining unit comprises a central computing unit configured to carry out the triangulation measurement between the at least one tag and the subset of the anchors.

9. The system according to claim 1, wherein:
   the system comprises a site monitoring unit configured for tracking movements of the plurality of anchors and the plurality of tags on the site by taking into account position information of tags provided by the position determining unit,
   the site monitoring unit comprises an event detector configured to detect at least one event associated with the site based on a classification of the movements of the plurality of anchors and the plurality of tags, and
   the system comprises a feedback unit configured to provide feedback information based on the at least one event.

10. The system according to claim 9, wherein:
    the system comprises a tracking unit configured to track the movements of the plurality of anchors and the plurality of tags, wherein the tracking unit is configured for providing positioning data associated to anchors and tags,
    the system is configured to determine a position determination offset associated to the positioning data of the tracking unit, wherein the position determination offset is determined by taking into account position information provided by the position determining unit, and
    the feedback unit is configured to provide the feedback information based on the position determination offset.

11. The system according to claim 9, wherein the system is configured to provide the feedback information as payload within the point-to-point radio ranging system to a set of receivers comprising at least one of a tag of the plurality of tags and an anchor of the plurality of anchors.

12. The system according to claim 9, wherein the event detector is configured for at least one of:
    recognition of a threat level,
    recognition of an activity associated with the site, and
    detection of an anomaly.

13. The system according to claim 9, wherein the event detector is based on at least one of:
    topological, logical, or functional relationships of different entities associated with the site,
    a timetable representing times of human or automatic activities associated with the site,
    an n-dimensional feature-space wherein an event is represented by an n-dimensional feature-vector and
    a neural network.

14. The system according to claim 9, wherein the system comprises a training functionality configured to process the movements of the plurality of anchors and the plurality of tags, and to provide update information for the event detector.

15. The system according claim 9, wherein:
the system comprises a site information unit configured to provide site information data to the event detector, and
the event detector is configured to take into account the site information data to detect the at least one event.

\* \* \* \* \*